United States Patent
Nagoshi

(10) Patent No.: US 7,097,268 B2
(45) Date of Patent: Aug. 29, 2006

(54) INK JET PRINTING METHOD AND INK JET PRINTING APPARATUS

(75) Inventor: Shigeyasu Nagoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 10/718,702

(22) Filed: Nov. 24, 2003

(65) Prior Publication Data

US 2004/0100516 A1  May 27, 2004

(30) Foreign Application Priority Data

Nov. 27, 2002 (JP) ............................. 2002-344504
Nov. 17, 2003 (JP) ............................. 2003-387172

(51) Int. Cl.
*B41J 2/01* (2006.01)

(52) U.S. Cl. ..................... 347/16; 347/14; 347/15; 347/105

(58) Field of Classification Search .............. 347/14, 347/16, 15, 105, 106
See application file for complete search history.

(56) References Cited

U.S. PATENT DOCUMENTS

| | | | |
|---|---|---|---|
| 5,739,828 A | 4/1998 | Moriyama et al. | |
| 5,742,301 A | 4/1998 | Ikeda | |
| 6,012,809 A | 1/2000 | Ikeda et al. | |
| 6,406,117 B1 | 6/2002 | Kuno et al. | |
| 6,471,347 B1 | 10/2002 | Koitabashi et al. | |
| 6,557,965 B1* | 5/2003 | Walker et al. | 347/16 |
| 6,578,944 B1* | 6/2003 | Kamei et al. | 347/16 |
| 2001/0007456 A1 | 7/2001 | Kuno et al. | |
| 2004/0095406 A1* | 5/2004 | Uchida | 347/16 |

FOREIGN PATENT DOCUMENTS

| | | |
|---|---|---|
| JP | 5-32024 | 2/1993 |
| JP | 7-314734 | 12/1995 |
| JP | 2000-59630 | 2/2000 |
| JP | 2001-191589 | 7/2001 |

* cited by examiner

*Primary Examiner*—Lamson Nguyen
(74) *Attorney, Agent, or Firm*—Fitzpatrick, Cella, Harper & Scinto

(57) ABSTRACT

An ink jet printing apparatus can execute a two-side printing capable of avoiding a show through effect while maintaining a specific print grade. Specifically, for the two-side printing, a small amount of a light cyan ink is used only within the range near white. To compensate for this, a dark cyan ink starts to be used near the range. Thus, the amount of ink outputted by converting the same signal values is smaller than that for the one-side printing. As a result, the total amount of landed ink can be reduced to decrease the show through effect in which landed ink passes from one side of a printing medium to another side of the printing medium.

8 Claims, 7 Drawing Sheets

INK JET PRINTING METHOD AND INK JET PRINTING APPARATUS

This application claims priority from Japanese Patent Application Nos. 2002-344504 filed Nov. 27, 2002 and 2003-387172 filed Nov. 17, 2003, which are incorporated hereinto by reference.

BACKGROUND OF THE INVENTION

1. Field of the Invention

The present invention relates to an ink jet printing method and an ink jet printing apparatus, and specifically, to a two-side printing in which printing is performed on both sides of a printing medium such as printing paper.

2. Description of the Related Art

One of the most important conditions to be considered in executing a two-side printing in ink jet printing is a show-through effect or a strike-through effect. In general, when a large amount of ink is ejected in printing images or the like, the ink may permeate through a printing paper to its side opposite to a side to which the ink has been ejected. As a result of this, an image may be observed in the opposite side or an image printed on the opposite side may be degraded.

To solve these problems, for example, the techniques described below have been disclosed. Japanese Patent Application Laid-open No. 5-032024(1993) describes a technique used for the two-side printing to change a dot pattern to reduce the density of dots to be printed. Japanese Patent Application Laid-open No. 7-314734(1995) describes a technique used for two-side printing to similarly change a dot pattern to reduce the dot density or to reduce driving power for a printing head and thus reduce the size of dots. By thus reducing the dot density or the dot size, the optical density of printed images can be reduced. As a result, the image printed on one side of a printing medium is less shown through the printing medium when viewed from another side of the printing medium because of its low optical density. Furthermore, Japanese Patent Application Laid-open No. 2000-059630 describes a technique used for two-side printing to change an under-color removal rate during a halftone processing so as to use a larger amount of black to reduce the total amount of ink used. This makes it possible to suppress the strike-through effect in which ink permeates through printing paper to the vicinity of the other side.

In recent years, it has been desirable that ink jet type printing apparatuses such as ink jet printers provide prints that are at the same level as that of silver salt photographs. One of the arrangements that can achieve this is the use of plural types of the same color ink (hereinafter simply referred to as "light and dark ink") provided with different color development densities by varying the concentration of color materials such as dyes or varying the color materials themselves. This light and dark ink achieves, for example, a smooth variation in the gradation of a printed image. This contributes to improving the print grade. In particular, it has been found that the addition of light ink is effective in reducing the granularity of a natural image having a large number of halftones.

If for example, a natural image is printed using such light and dark ink, a large area of the image is often occupied by relatively bright parts such as flesh color, sky blue, and the like. In this case, in the prior art, for these bright portions, the amount of light ink landed is increased, while the amount of dark ink landed is reduced. Furthermore, to achieve the same density, the amount of light ink must be larger than the amount of dark ink.

Accordingly, if a two-side printing is executed using light and dark ink, a larger amount of ink is used in the bright parts. This is disadvantageous in terms of the show through effect or the like. In particular, the amount of solvent increases consistently with increasing of the amount of light ink used, and thus increases the possibility of an occurrence of the show through effect.

When a two-side printing is executed using such light and dark ink, the show through effect may be suppressed by applying the technique of reducing the dot density or dot size as described in Japanese Patent Application Laid-open No. 5-032024(1993) and Japanese Patent Application Laid-open No. 7-314734(1995). However, this technique may severely degrade image quality such as the gradation or granularity of the image. For example, if the dot density or dot size is reduced in bright parts of the image such as flesh color or sky blue, the optical density in these parts decreases. Consequently, the density becomes discontinuous between these parts and other parts. On the other hand, if the dot density or dot size is reduced all over the image, the entire optical density decreases. Furthermore, a decrease in dot density particularly causes dark dots to be dispersed to increase the granularity.

The results are similar if the technique described in Japanese Patent Application Laid-open No. 2000-059630 is applied. Although the total amount of ink used can be reduced, tints of the printed image may be markedly different from those in, for example, one-side printing owing to an increase in under-color removal rate.

SUMMARY OF THE INVENTION

An object of the present invention is to provide an ink jet printing method and an ink jet printing apparatus that can execute a two-side printing capable of avoiding show through effect while maintaining a specific print grade.

In the first aspect of the present invention, there is provided a printing method using a first printing material and a second material that is of the same color as that of the first printing material and has higher development density than that of the first printing material, to print an image on a printing medium, the method comprising:

a selecting step for selecting a printing mode to be used for printing from a one-side printing mode in which printing is performed on only one side of the printing medium and a two-side printing mode in which printing is performed on both sides of the printing medium; and a determining step for determining a printing condition according to the printing mode selected in the selecting step, wherein the determining step (A) determines the printing condition so that printing is performed with use of the first and the second printing material, when the one-side printing mode is selected in the selecting step, and (B) determines the printing condition so that printing is performed with use of the second printing material but without use of the first printing material, when the two-side printing mode is selected in the selecting step In the second aspect of the present invention, there is provided a printing method using a first printing material having relatively lower development density and a second printing material having relatively higher development den sity for the same color, to print an image on a printing medium, the method comprising:

a setting step for setting one printing mode of a one-side printing mode in which printing is performed on only one side of the printing medium and a two-side printing mode in which printing is performed on both sides of the printing medium; and a generating step for generating printing data according to the printing mode set in the setting step, wherein the generating step generates the printing data so that the first printing material is used at smaller amount and the second printing material is used at greater amount when the two-side printing mode is set, in comparison with when the one-side printing is set.

In the third aspect of the present invention, there is provided a printing apparatus for using a first printing material and a second material that is of the same color as that of the first printing material and has higher development density than that of the first printing material, to print an image on a printing medium, the apparatus comprising;

selecting means for selecting a printing mode to be used for printing from a one-side printing mode in which printing is performed on only one side of the printing medium and a two-side printing mode in which printing is performed on both sides of the printing medium; and determining means for determining a printing condition according to the printing mode selected by the selecting means, wherein the determining means (A) determines the printing condition so that printing is performed with use of the first and the second printing material, when the one-side printing mode is selected in the selecting step, and (B) determines the printing condition so that printing is performed with use of the second printing material but without use of the first printing material, when the two-side printing mode is selected by the selecting means.

In the fourth aspect of the present invention, there is provided a printing apparatus for using a first printing material having relatively lower development density and a second printing material having relatively higher development density for the same color, to print an image on a printing medium, the apparatus comprising:

setting means for setting one printing mode of a one-side printing mode in which printing is performed on only one side of the printing medium and a two-side printing mode in which printing is performed on both sides of the printing medium; and generating means for generating printing data according to the printing mode set by the setting means, wherein the generating means generates the printing data so that the first printing material is used at smaller amount and the second printing material is used at greater amount when the two-side printing mode is set, in comparison with when the one-side printing is set.

According to the arrangement of the present invention, when two types of printing materials such as dark ink and light ink are used, printing conditions are determined so that both dark and light inks are used for one-side printing, whereas only the dark ink is used for two-side printing. Thus, the non-use of a printing material with a low color development density is compensated for by the use of a printing material with a high color development density such as dark ink. This makes it possible to express an equivalent optical density using a smaller total amount of applied printing material. As a result, the total amount of printing material used for printing decreases to suppress the show through effect of the printing medium.

Furthermore, when performing the two-side printing which uses two types of printing materials such as the dark ink and the light ink, the amount of light ink used for printing is reduced. This makes it possible that the show through effect is suppressed as a result of a decrease in the total amount of printing material used, while still reducing the granularity of a halftone image.

Moreover, a method used when the light and dark ink is used is as follows. A maximum value is set as a light ink set amount, which is set in a condition that lightness changes from brighter color to darker color in the same hue, for example, a change from white to red and is set so that the set amount is increased up to a predetermined lightness and then decreased from the predetermined lightness. This maximum value can be set by using, as a limit, the amount of ink that can be absorbed by the surface of a printing medium. On the other hand, the dark ink is available for supplementing the optical density with a small amount of dark ink. Accordingly, the dark ink amount is set so as to increase gradually once the amount of light ink used stops increasing, in order to compensate for a decrease in the optical density. In this case, the maximum value for the light ink is set to be smaller for two-side printing than that for one-side printing. This enables the ink amount to be reduced in halftone areas. Furthermore, the dark ink amount is set to increase gradually as the light ink amount decreases in darker lightness areas. This enables the granularity to be continuously reduced. Moreover, the show through effect or the like in two-side printing can be suppressed while preventing a decrease in the optical density.

Preferably, to minimize a difference in tone between one-side printing and two-side printing, a curve expressing the light ink set amount is designed so that the amount values for one-side printing and two-side printing remain on the same curve until the maximum value is reached. Moreover, since the maximum value of the light ink amount for two-side printing is set to be smaller than that for one-side printing in order to reduce the total amount of printing material used, the maximum value of the light ink amount is reached at a brighter lightness.

In the case that the dark ink amount is gradually increased to compensate for a decrease in the light ink amount, a rapid increase in the dark ink amount may result in degradation of gradation such as a false line. Thus, desirably, a small amount of dark ink starts to be added at lightness slightly brighter than that for the maximum value of the light ink amount, i.e. at lightness little before point at which the light ink amount start to decrease. Then, the dark ink amount is gradually increased. Specifically, the dark ink amount at the maximum value of the light ink amount is larger than zero. As the dark ink amount becomes large, the granularity is more likely to increase. Thus, a darker side limit of lightness for which decreasing the granularity is kept to be considered relates to the amount of solvent that can be absorbed by the surface of a printing medium or a requested printed image grade. Therefore, the dark ink amount must be set in accordance with the amount of absorbed solvent and the requested image grade. Furthermore, the point of the maximum value of the light ink amount shifts to a darker lightness side along the above curve as the light ink amount is increased to prevent the granularity from increasing. Correspondingly, the lightness at which the dark ink amount starts to be increased also shifts toward the darker lightness side.

The above described arrangement relates to printing materials having two types of color development densities, light and dark. However, similar settings can be accomplished even using three or more types of color development densities such as dark, medium, light.

The above arrangement serves to reduce the amount of ink ejected (landed) per unit area of a printing medium for two-side printing compared to one-side printing, while keeping desirable gradation. It is thus possible to reduce the amount of solvent contained in the printing material which permeates through to the backside of a printing medium.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will described below in detail with reference to the drawings.

Figure 1:
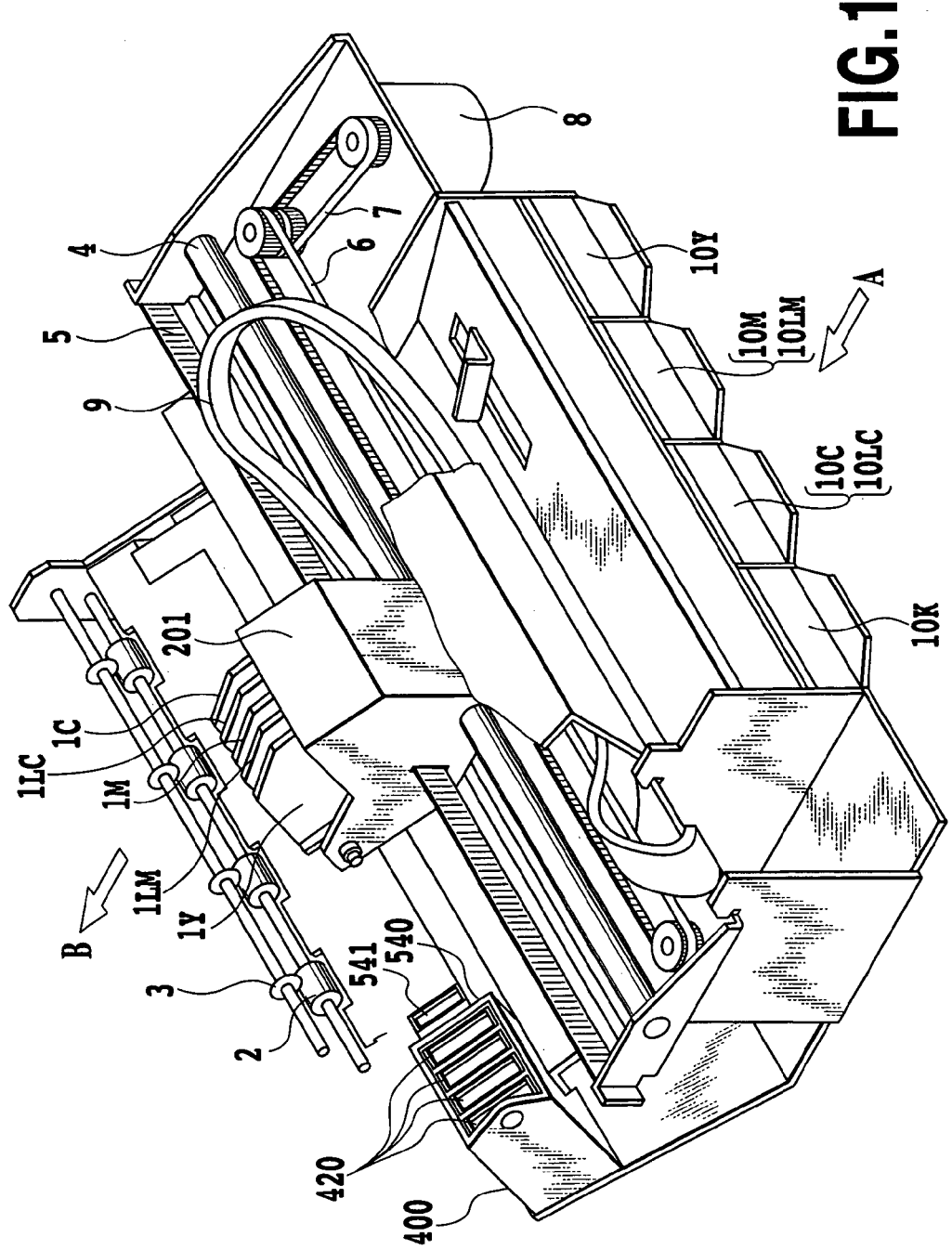
FIG. 1 is a perspective view showing an ink jet printer according to an embodiment of the present invention.

FIG. 1 is a perspective view showing an ink jet printer according to an embodiment of the present invention.

A printing head 1 is a device comprising plural ejection openings, from which ink droplets are ejected to form dots on a printing medium so as to print an image. The printing head 1 is used for each of different color inks and for each of plural types of a predetermined one of these color inks which types have different dye concentrations. Specifically, printing heads 1Y, 1M, 1LM, 1C, and 1LC are used for yellow (Y) ink, dark magenta (M) ink, light magenta (LM) ink having a lower dye concentration than the dark magenta (M) ink, dark cyan (C) ink, light cyan (LC) ink similarly having a lower dye concentration than the dark cyan (C) ink, and black (K) ink, respectively. These printing heads are removably installed on a carriage 201. Each printing head comprises an electrothermal converting element that generates thermal energy in an ink passage communicating with the corresponding ejection opening. The thermal energy generated is utilized to generate bubbles in the ink. The pressure of the bubbles then causes the ink to be ejected.

A carriage 201 has its movement in a main scanning direction controlled in accordance with a scanning speed and a scanning position detected by a speed detecting mechanism 5. As the printing heads are scanned on the basis of the control, the ejection of ink from each printing head is also controlled to print an image based on printing data. The carriage 201 can move along a guide shaft 4 as described above when the driving force of a carriage driving motor 8 is transmitted to the carriage 201 via belts 6 and 7.

A recovery unit 400 serves to keep each printing head in appropriate ejection conditions. The recovery unit 400 comprises a cap and other components. Specifically, when the carriage 201 moves to a home position, the position at which it lies opposite the recovery unit 400, caps 420 cover the surfaces of the respective printing heads in which the ejection openings are disposed. This prevents ink solvents from evaporating from the ejection openings, thus preventing the ink from becoming more viscous or being solidified. Furthermore, in this capping state, a suction recovery operation is performed by using a pump (not shown) to suck and discharge ink from the interior of the ejection openings to remove very viscous ink such as that mentioned above. The viscosity increases because for example, during a printing operation, the ink is not always ejected from all the ejection openings in the printing heads, i.e. the number of ejection openings from which the ink is ejected varies depending on printing data, so that the evaporation of the ink solvents is facilitated in the ejection openings in which ejection is not carried out for a certain time. As another ejection recovery process, what is called preliminary ejection is carried out which is easier than the above suction recovery process and which is executed more frequently than the above suction recovery process. With the preliminary ejection, during a printing operation, the carriage 201 moves to the home position at predetermined time intervals. Then, the printing heads eject the ink into the respective caps 420 to discharge very viscous ink or the like from the interior of the ejection openings. The ink ejected into the caps 420 by the preliminary ejection is sucked by the pump as in the case with the above suction recovery. The ink is then stored in waste ink tanks.

A printing medium is conveyed by a predetermined amount each time the printing heads are scanned. This allows one page of a printing medium to be printed. The printing medium is conveyed by a conveying mechanism comprising a paper feed member (a rubber roller or the like) driven by a paper feed motor (not shown). During the conveyance, paper is fed in the direction of arrow A in FIG. 1. When the paper reaches a printing position, the printing heads are scanned to perform a printing operation as described above. Subsequently, paper discharging mechanisms 2 and 3 discharge the paper in the direction of arrow B.

The ink is supplied from ink cassettes 10K, 10C, 10LC, 10M, 10LM, and 10Y to the corresponding printing heads via supply paths (not shown). In the present example, the dark and light cyan ink cassettes are integrated together, and the dark and light magenta ink cassettes are integrated together.

When a two-side printing is executed using the above ink jet printer, after a printing medium has had one surface (first side) of it printed and has then been discharged, a user turns the printing medium upside down and sets it at the paper feed position again to print the remaining surface (second side). Of course, a two-side printing may be automatically executed using a paper feed mechanism including a sheet reversing mechanism for the two-side printing.

Figure 2:
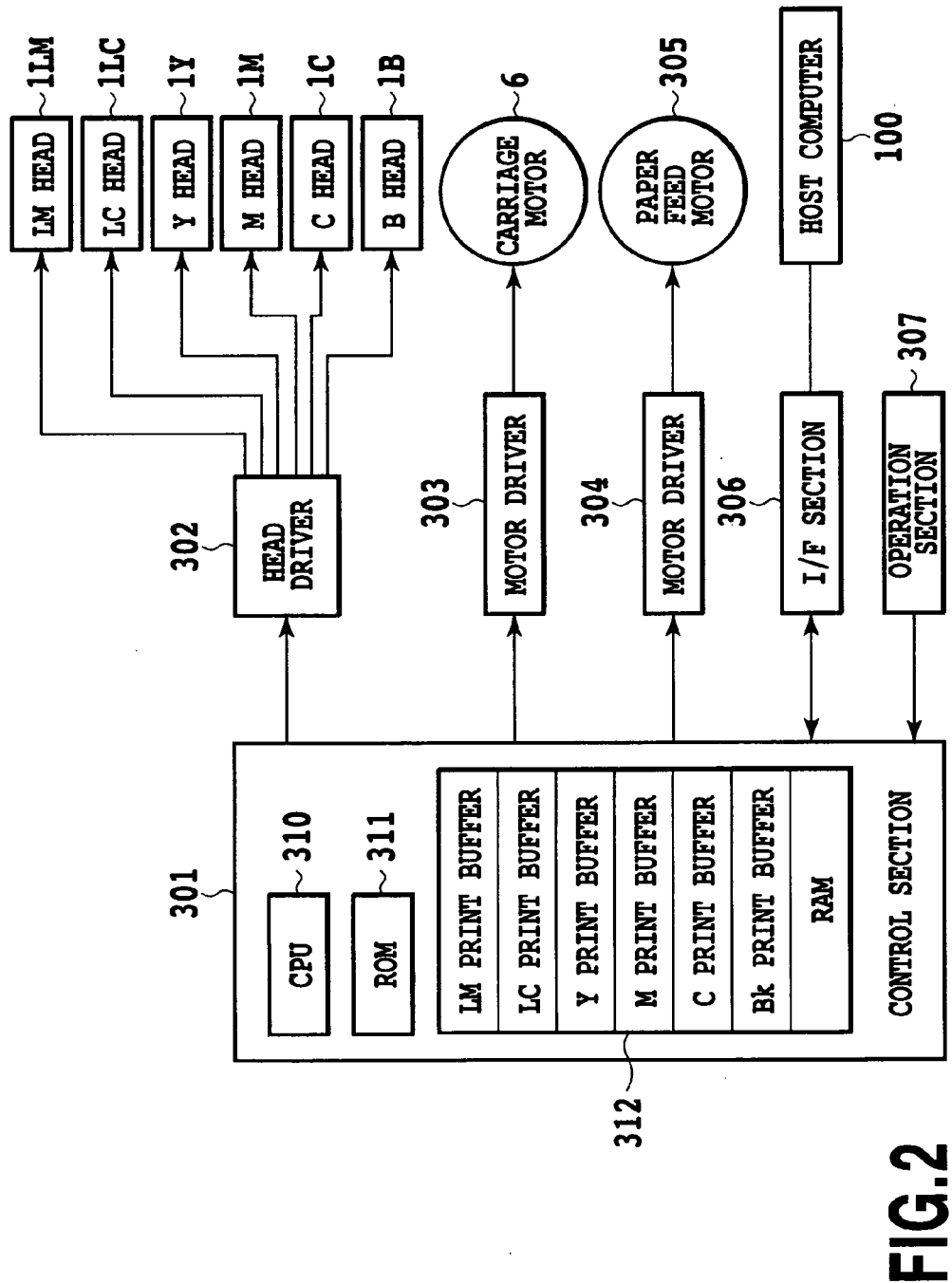
FIG. 2 is a block diagram showing a control arrangement in the ink jet printer shown in FIG. 1.

FIG. 2 is a block diagram showing a control arrangement in the ink jet printer shown in FIG. 1.

In FIG. 2, reference numeral 301 denotes a control unit that controls operations in the whole of the printer. The control unit 301 comprises a CPU 310 such as a microprocessor, a ROM 311 that stores control programs and various other programs executed by the CPU 310, a RAM 312 which is used as a work area when the CPU 310 executes any of the various processes and which temporarily saves various data, and other components. The RAM 312 is provided with a receive buffer in which printing data received from a host computer 100 is recorded, and print buffers which store printing data in association with the printing heads 1K, 1C and 1LC, 1M and 1LM, and 1Y and which corresponds to the colors C, M, Y, K, LC, and LM, respectively. Reference numeral 302 denotes a head driver that drives each of the printing heads 1C, 1M, 1Y, 1K, 1LC, and 1LM in accordance with printing data on each color outputted by the control unit 301 and described later in FIG. 4.

Reference numerals 303 and 304 denote motor drivers that drive the carriage driving motor, 8 and the paper feed motor 305, respectively, on the basis of control signals from the control unit 301. Reference numeral 306 denotes an interface section that controls an interface between the printer of this embodiment and the host computer 100. Reference numeral 307 denotes an operation section comprising various keys and a display such as an LCD which are operated by the user.

Figure 3:
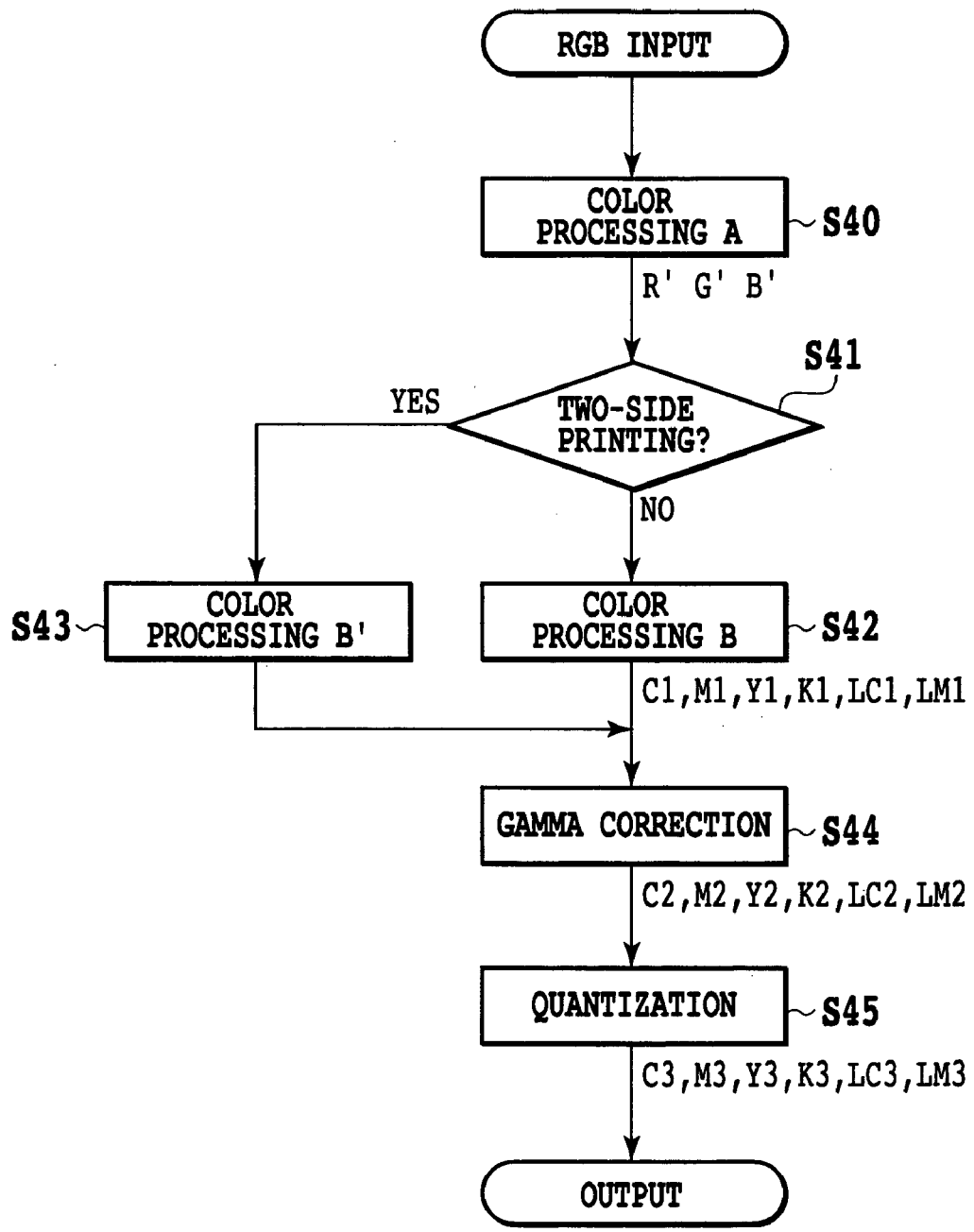
FIG. 3 is a flow chart showing a processing for generating printing data in an ink jet printer according to a first embodiment of the present invention.

FIG. 3 is a flow chart showing a processing for generating printing data in the ink jet printer according to the present embodiment described above. During these processes, color processing according to the respective embodiments, described below in FIGS. 4 to 7, is also executed. In the description of the present embodiment, these processes are executed by the printer of this embodiment. However, some of the processes may be executed by the printer, while the others may be executed by the host computer. Alternatively, all the processes may be executed by the host computer, which then transfers quantized data to the present printer.

As shown in FIG. 3, upon receiving from the host computer 100 original image signals R, G, and B obtained through its processing, the printer first executes a color processing A (S40). This process converts the image signals R, G, and B into signals R', G', and B' for a color space specific to the printer of this embodiment. The original image signals R, G, and B are not limited to those obtained by the host computer but may be obtained by, for example, using a scanner.

Then, it is determined whether a printing operation relating to this process is two-side printing or one-side printing (S41). In this embodiment, the amount of ink ejected (landed) per unit area of a printing medium during printing is controlled depending on whether the printing operation is for two-side printing or one-side printing. Thus, the show through effect, which may occur in two-side printing, is prevented while maintaining the print grade of images.

Figure 4:
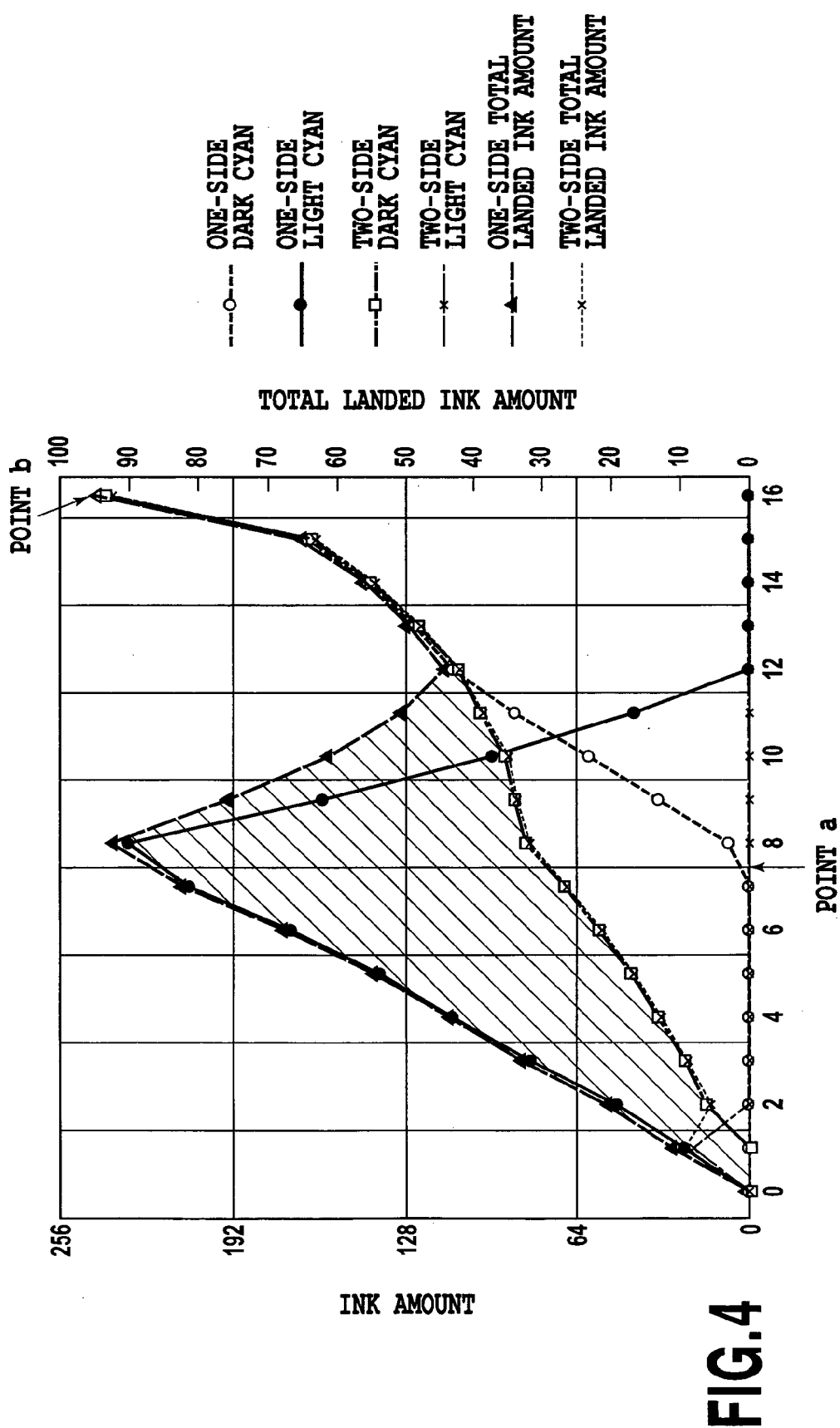
FIG. 4 is a graph illustrating the contents of a table used in the color processing B and B' shown in FIG. 3.

If it is determined that the printing operation is for one-side printing, then in step S42, a color processing B is executed. On the other hand, if it is determined that the printing operation is for two-side printing, then in step S43, a color processing B' is executed. The color processes B and B' convert the signals R', G', and B' into signal values corresponding to the color inks used in the printer of this embodiment. Since the six color inks are used in this embodiment, the signals are converted into density signals C1, M1, Y1, K1, LC1, and LM1 for dark cyan, dark magenta, yellow, black, light cyan, and light magenta, respectively. In this case, conversions described later in FIG. 4 are executed depending on whether the printing operation is determined to be for one-side printing or two-side printing.

Then, gamma (γ) correction is executed (S44). This process executes gamma correction using a gamma correction table. Then, density signals C2, M2, Y2, K2, LC2, and LM2 obtained by the correction are quantized (S45). In this process, a binarization process is executed on each of the signals obtained by the correction to generate image signals C3, M3, Y3, K3, LC3, and LM3 transferred to the corresponding printing heads 1C, 1M, 1Y, 1K, 1LC, and 1LM. The binarization used in a quantizing process may comprise, for example, a dither method. The dither method carries out binarization using a predetermined dither pattern having different thresholds for density signals for the corresponding pixels.

The color processes B and B' use tables each storing signal value data on the six types of inks used in the printer in association with 256-level signal values for each of R, G, and B. More specifically, the color processes B and B' use different tables for the respective types of print media used in the present printer. For each printing medium, different tables are used for one-side printing and for two-side printing as described later in FIG. 4.

The amount of ink that can be placed or landed per unit area varies depending on the type of printing media used in the ink jet printer. Some printing media allow 2 dots of ink droplets to be placed in a unit area, for example, one pixel at a density (resolution) of 1,200 dpi×1,200 dpi, while others allow up to 2.2 dots of ink droplets to be placed in the same unit area. In this case, if an excessive amount of ink is placed, the resulting print may be degraded owing to bleeding. The table is varied depending on the type of printing media. Moreover, almost all the components of the ink used in the ink jet printer are a liquid, a solvent, and the like which are different from dye of color materials providing color development. Accordingly, as the amount of ink landed on a printing medium increases, the water and solvent containing the dyes move from a printed surface to a back surface, resulting in the show through effect. Thus, in this embodiment, even for the same printing media, different tables are provided for one-side printing and for two-side printing.

In this embodiment, as described above in FIG. 1, plural inks with different dye concentrations are used for the same color. For example, cyan ink, dark cyan ink and light cyan ink are composed of components that are almost the same except for their dye concentrations. By using the inks of the different dye concentrations to express bright parts of an image with the light ink, while expressing dark parts with the dark ink, it is possible to provide the dark parts with a sufficient density. Alternatively, plural inks in which color materials per se having different color development densities are respectively contained may be used. In this case, ink containing the color material of higher color development density corresponds to the dark ink and ink containing the color material of lower color development density corresponds to the light ink. According to these ink components, flexibility of ink design can be increased such that the maximum use amount of the light ink can be increased and lightness at the maximum amount of the light ink can be shifted toward the darker side. However, the technical method according to the present invention is the same as the case that the plural inks having different dye concentrations are used.

(First Embodiment)

FIG. 4 is a view illustrating the contents of the table used in tile color processing B and B' according to the first embodiment of the present invention. This figure shows an example in which a color expressed by the image signals R, G, and B varies from white to cyan for the cyan hue. Specifically, this figure shows, for each of one-side printing and two-side printing, respective signal values for dark cyan and light cyan which are the result of converting with use of the tables for converting the signals R, G, and B and outputting the converted signals. That is, this figure shows apart of the contents of the respective tables. The axis of abscissa indicates the combinations of the signal values R, G, and B, i.e. a color varying from white to cyan corresponding to the sets of these signals, at 16 points. The axis of ordinate indicates the respective signal values for dark cyan and light cyan, i.e. output values from the table corresponding to the values of 16 points. In the figure, these signal values for dark cyan and light cyan are each shown as an "ink amount" corresponding to one of the values 0 to 256. The "total landed ink amount" in the figure indicates the total amount of dark or light ink ejected to a printing medium. In this connection, the case in which one dot is formed by ejecting one ink droplet to a unit area, e.g. one pixel is defined as 100%. In other words, this corresponds to the percentage of the number of dots actually formed in an area of a certain size relative to the maximum number of dots formed in this area. If a printing operation can be performed using plural ejection amounts corresponding to the different sizes (volumes) of ink droplets ejected in the same printer, the total arranged ink amount can be defined as N×100% by determining a reference ejection amount and calculating the number of dots in the reference ejection amount to which an ink amount to be determined corresponds.

When the gradation of cyan hue varying from white to cyan as shown in the figure is printed, for one-side printing, only the light cyan ink is used in areas with relatively low densities (0 to a point a) which are close to white. Then, when the signal value reaches the point a, the dark cyan ink starts to be used to increase its amount, while gradually reducing the amount of light cyan ink used. The start point of use of the dark ink can be determined on the basis of the concentration relationship between the light ink and the dark ink For example, a switching point between the dark ink and the light ink is determined so that even if dark ink dots are placed among light ink dots, they do not stand out. In this manner, at a point b at which the signal value is at maximum, the dark cyan ink has its maximum value.

In the color processing executed for one-side L printing described above, the total landed ink amount is close to 100% near the maximum density (the point a) that can be expressed with the light ink. Furthermore, at the point a, the dark ink starts to be placed, so that 100% may be exceeded. In the succeeding part, the amount of light ink is gradually reduced because if the light ink and the dark ink are switched rapidly, the total landed ink amount decreases rapidly to exhibit unnatural dot filling on the printing medium. Thus, the total placed ink amount tends to increase. As shown in FIG. 4, the maximum value of the total landed ink amount within the range in which the color varies from white (R=G=B=255) to cyan (point b; R=0 and G=B=255) is 92% near the point a, at which the signal values R=0, G=112, and B=112. Subsequently, the total landed ink amount decreases gradually and then increases again. At the point b, at which R=0 and G=B=255, the total landed ink amount of cyan is 94%.

Thus, for the one-side printing, the total landed ink amount is generally large. Accordingly, it is likely that the printing medium undergoes the show through effect. However, even if the show through effect occurs, the grade of images printed on the printed surface is not affected.

On the other hand, for the two-side printing, the light ink is used even within the range of colors with relatively small densities which are close to white, in order to generally reduce the total landed ink amount.

As shown in FIG. 4, for the two-side printing, a small amount of light cyan ink is used only within the range from point 0 to point 2. To compensate this, the dark cyan ink starts to be used at point 1. Thus, the amount of ink (cyan signal value) outputted by converting the same (R, G, and B) signal values is smaller than that for the one-side printing. This enables the total landed ink amount to be reduced.

As shown in the figure, the maximum value of the total landed ink amount within the range from white to cyan is 94%, corresponding to cyan color (point b; R=0 and G=B=255). That is, the maximum value does not occur at the point a as in the case with the one-side printing. At color of this point a, the total landed ink amount is about 33%. This indicates that at the point a, the total landed ink amount decreases by 59% (92–33). The decrease in total landed ink amount from white to cyan is shown by the shaded portion bounded by the total landed ink amount for the one-side printing and the total landed ink amount for the two-side printing.

The printer according to this embodiment has both dark and light inks for each of cyan and magenta and only dark ink for black and yellow, a total of six types of inks. The present invention is not limited to this case, but can also be applied, by using darker inks instead, to the case in which each color has both dark and light inks or each color has three types of inks, i.e., dark ink, middle ink, and light ink. Furthermore, in the present embodiment, the color processing table is varied so as to vary the color processing B, shown in FIG. 3 between the one-side printing and the two-side printing. However, arrangements other than the tables may be used provided that they can vary the use ratio of the dark ink to the light ink. For example, a hard-wired logic circuit may be used.

As described above, when the color varying from white to cyan is printed, the total landed ink amount can be reduced over a relatively wide range. Correspondingly, the possibility of occurrence of the show through effect can be reduced. To suppress the show through effect, it may be considered that for the two-side printing, the amount of ink used may be uniformly reduced. However, in this case, the optical density of the printed image often decreases to degrade color development. In contrast, in the present embodiment, even if the total amount of ink used decreases, the dark ink is used instead. This can ensure an amount of dyes required for color development, i.e., the required concentration to prevent problems such as the degradation of color development and the loss of gradation.

Of course, the present invention is also applicable to colors other than the one varying from white to cyan as shown in the above example. In the case of two-side printing, for the primary colors other than cyan and secondary colors obtained by mixing these primary colors together, the dark ink may be used within the range in which the light ink is used.

(Second Embodiment)

Figure 5:
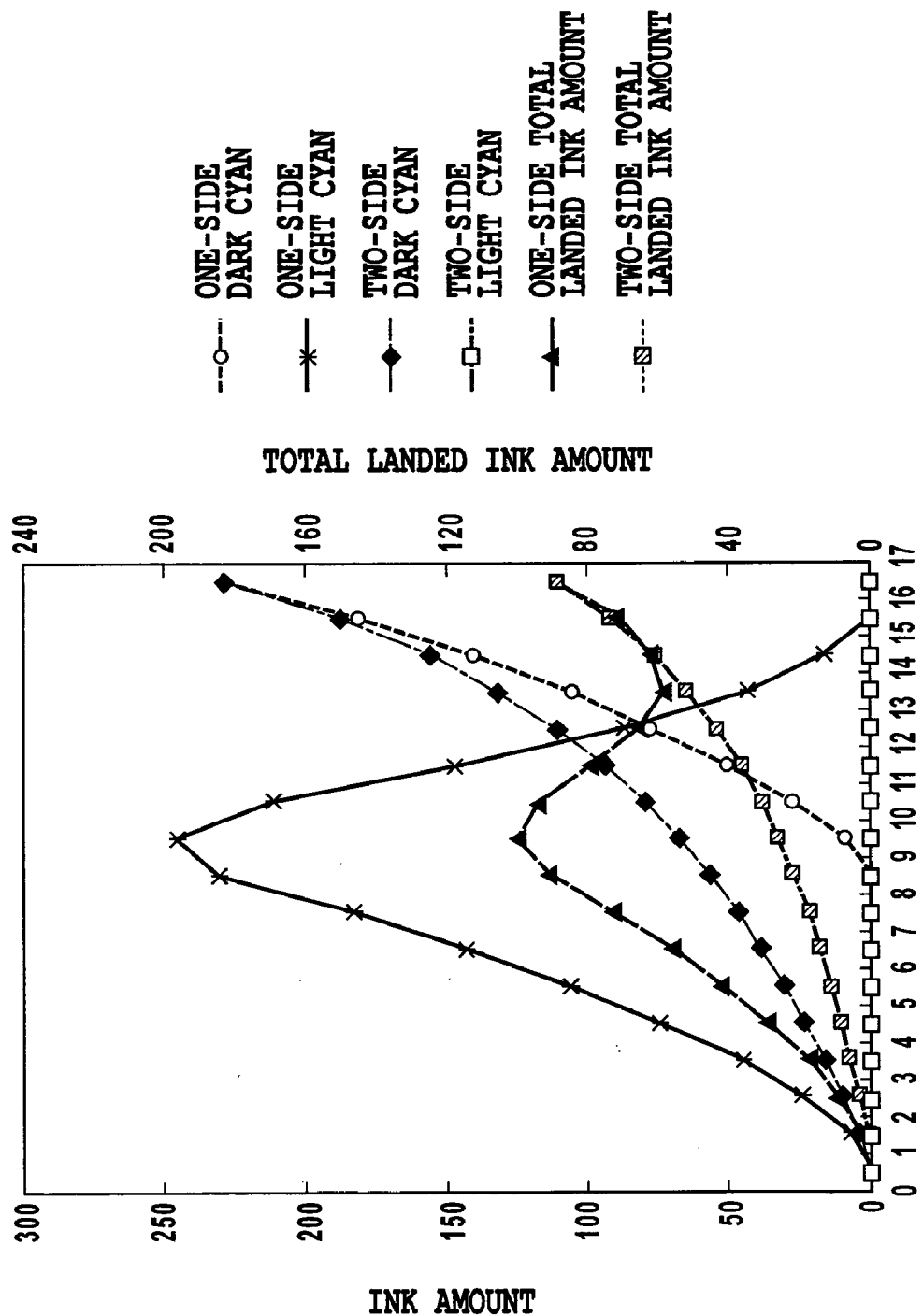
FIG. 5 is a graph showing the contents of a table used for a color processing according to a second embodiment of the present invention, the graph being similar to FIG. 4, shown in connection with the first embodiment.

FIG. 5 is a graph showing the contents of a table used for a color processing according to a second embodiment of the present invention, the graph being similar to FIG. 4, shown in connection with the first embodiment. The example of this figure shows that, when color expressed by the image signals R, G, and B varies from white to cyan in the cyan hue, for each of one-side printing and two-side printing, signal values for dark cyan and light cyan are obtained as converted signals by using the tables for converting the above image signals R, G, and B and outputting the converted signals.

As shown in this figure, in the present embodiment, the amount of light cyan landed is set at 0 for the two-side printing. In the first embodiment, shown in FIG. 4, for the two-side printing, the light cyan is used in a small area corresponding to colors close to white (points 0 to 2). However, the present embodiment uses such a table as prevents the light cyan from being used within the range of the cyan hue from white to cyan. Correspondingly, for the two-side printing, the dark cyan starts to be placed or landed at a point for white (point 0), and is then increased up to a point for cyan (point 17). In this area of points 0 to 17, for the one-side printing, the maximum landed ink amount of cyan is reached at an almost intermediate position of the area, and the area has a relatively high lightness. According to prior art, for the two-side printing, the landed amount of the light cyan ink becomes large for this area with a relatively high lightness. In contrast, according to the present embodiment, the landed ink amount is reduced. Specifically, it is set at 0 as described above, and the dark cyan ink is landed so as to supplement decreasing the optical density.

(Third Embodiment)

Figure 6:
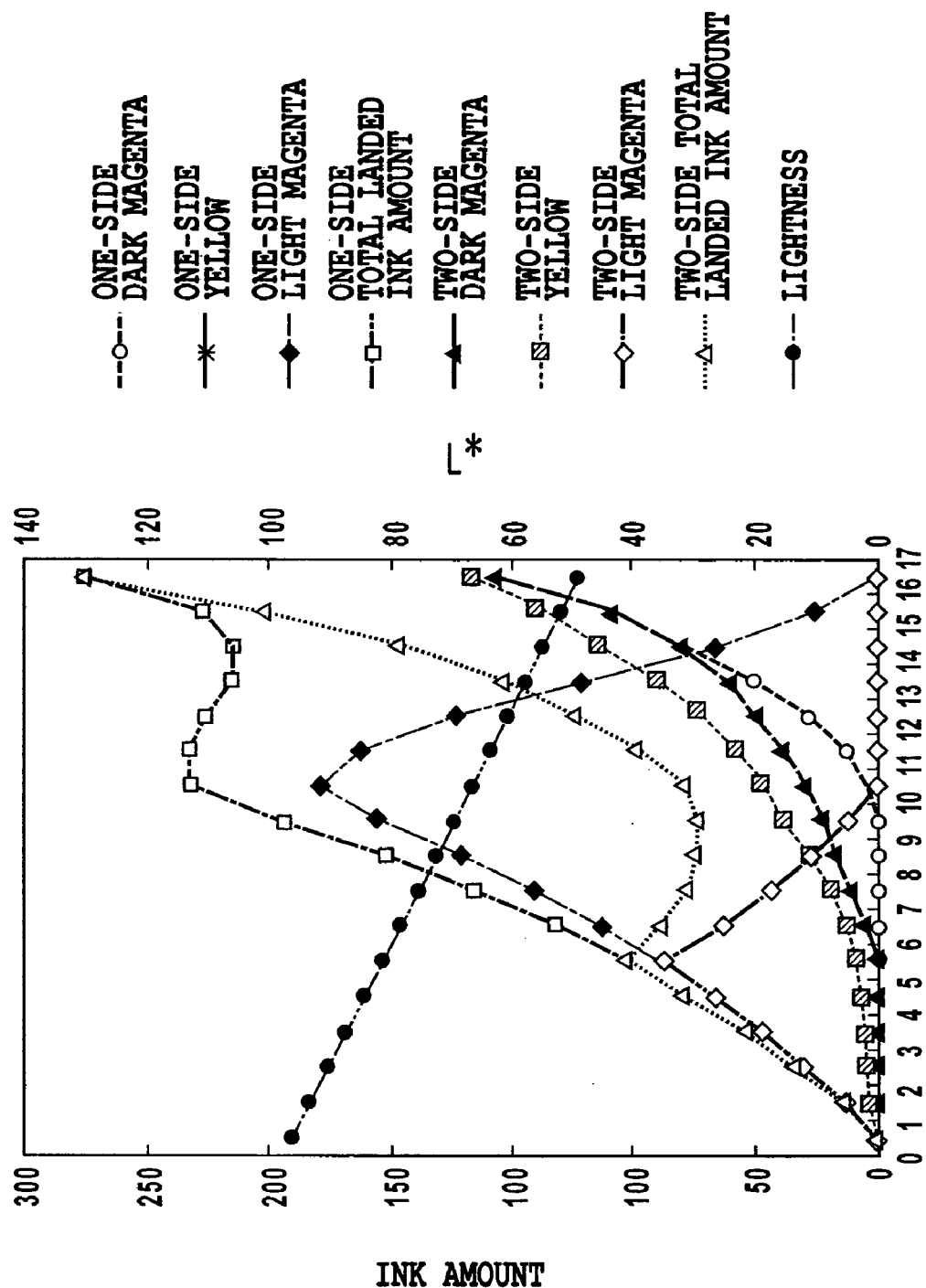
FIG. 6 is a graph showing the contents of a table used for a color processing according to a third embodiment of the present invention, the graph being similar to FIG. 4, shown in connection with the first embodiment.

FIG. 6 is a graph showing the contents of a table used for a color processing according to a third embodiment of the present invention, the graph being similar to FIGS. 4 and 5, shown in connection with the first and the second embodiments respectively. In the example shown in this graph, a color of the red hue expressed by the image signals R, G, and B varies from white to red. Specifically, this figure shows, for each of one-side printing and two-side printing, converted signal values for yellow, dark magenta, and light magenta obtained by using the tables for converting the signals R, G, and B and outputting the converted signals, Unlike FIGS. 4 and 5, FIG. 6 shows lightness in addition to the signal values.

Flesh color in this hue is in the area shown in the figure often and has a lightness (L*) between 75 and 85, which is represented using an L*a*b* space. Thus, in the present embodiment, the light magenta ink is used in this area to reduce the granularity. A point 6 on the axis of abscissa corresponds to the lightness of about 80. In the present embodiment, for the two-side printing, the landed amount of light magenta ink is gradually increased up to the point 6 (in a direction from a point 1 to a point 17, the same as the case described hereinafter). Then, from this point as the maximum amount, the landed amount is reduced and reaches 0 at a point 11. From this point, the landed amount is maintained at 0. The dark magenta ink starts to be provided at the point 6, corresponding to the lightness of 80. Specifically, the light magenta ink, which slightly affects the granularity, is used at the lightness greater than or equal to 80. On the other hand, the dark ink is used at the lightness below 80 to reduce the landed ink amount.

More detailed description is as follows. A maximum value is set as the light magenta ink set amount for both one-side printing and two-side printing. The maximum value is set in a condition that lightness varies according to a change of color in the same hue, for example, a change from white to red and is set so that the set amount is increased up to a predetermined lightness and then decreased from the predetermined lightness. This maximum value can be set by using, as a limit, the amount of ink that can be absorbed by the surface of a printing medium. On the other hand, the dark magenta ink is available for supplementing the optical density with a small amount of dark ink. Accordingly, the dark magenta ink amount is set so as to increase gradually once the amount of the light magenta ink used stops increasing, in order to compensate for a decrease in the optical density. In this case, the maximum value of the light magenta ink is set to be smaller for, the two-side printing than that for the one-side printing. This enables the ink amount to be reduced in halftone areas. Furthermore, the dark magenta ink amount is set to increase gradually as the light magenta ink amount decreases in darker lightness areas. This enables the granularity to be continuously reduced. Moreover, the show through effect or the like in the two-side printing can be suppressed while preventing a decrease in the optical density.

Further, to minimize a difference in tone between the one-side printing and the two-side printing, a curve expressing the light ink set amount is designed so that the amount values for one-side printing and two-side printing remain on the same curve until the maximum value is reached. Moreover, since the maximum value of the light ink amount for two-side printing is set to be smaller than that for one-side printing in order to reduce the total amount of printing material used, the maximum value of the light ink amount is reached at a brighter lightness.

In the case that the dark ink amount is gradually increased to compensate for a decrease in the light ink amount, a rapid increase in the dark ink amount may result in degradation of gradation. Thus, desirably, a small amount of dark ink starts to be added at lightness slightly brighter than that for the maximum value of the light ink amount, i.e., at lightness slightly before point at which the light ink amount starts to decrease. Then, the dark ink amount is gradually increased. Specifically, the dark ink amount at the maximum value of the light ink amount is larger than zero.

In FIGS. 4 to 6, at a point "17", the same landed ink amount is used for the one-side printing and for the two-side printing. However, it should be appreciated that different landed ink amounts may be used at the position "17". However, a color reproduction range is correspondingly narrowed.

(Fourth Embodiment)

Figure 7:
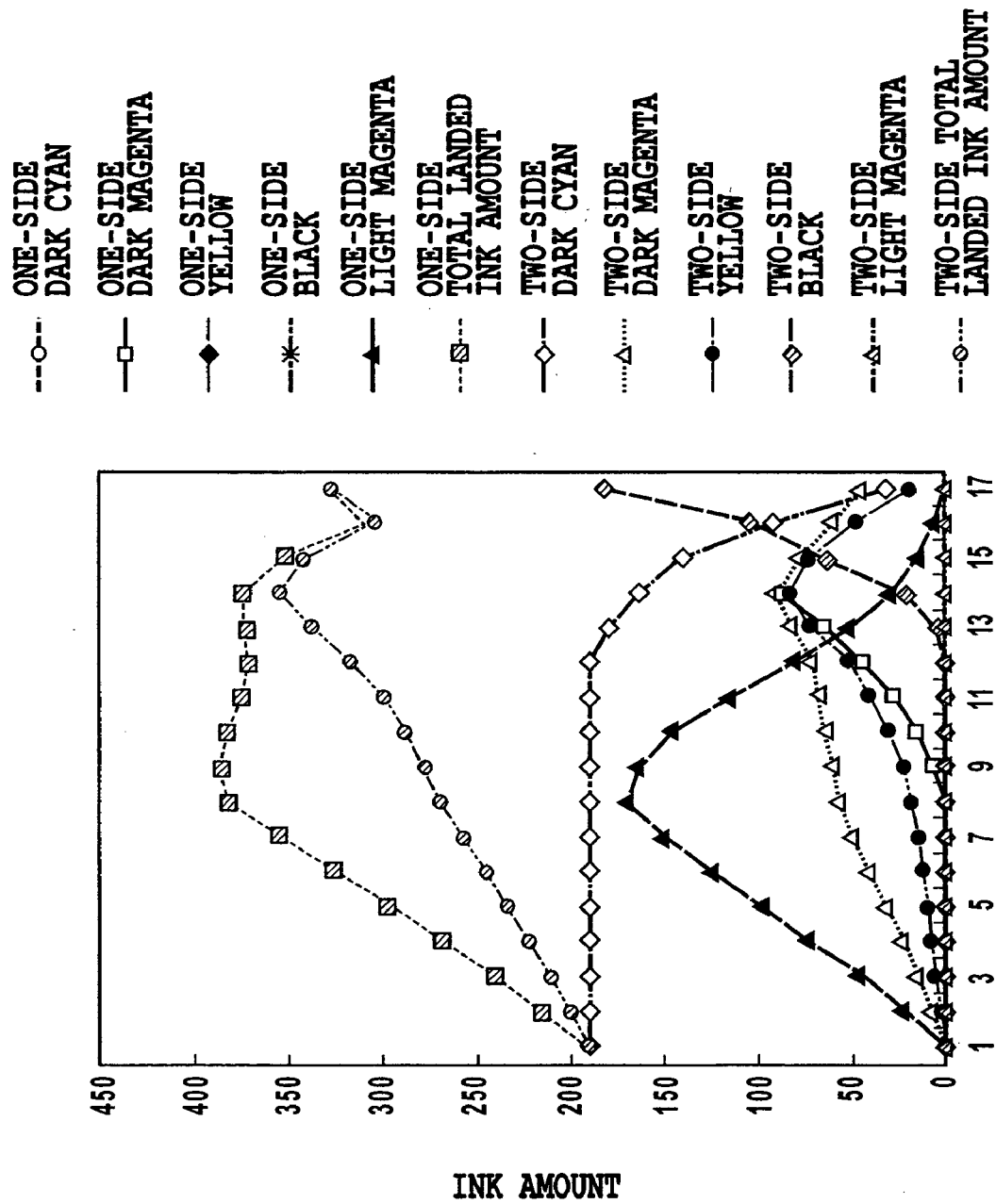
FIG. 7 is a graph showing the contents of a table used for a color process according to a fourth embodiment of the present invention, the graph being similar to FIG. 4, shown in connection with the first embodiment.

FIG. 7 is a graph showing the contents of a table used for a color processing according to a fourth embodiment of the present invention. In the example shown in this graph, a color of the cyan hue expressed by the image signals R, G, and B varies from cyan to black. Specifically, this figure shows, for each of one-side printing and two-side printing, signal values for yellow, dark magenta, light magenta, and dark cyan obtained by using the tables for converting the signals R, G, and B and outputting the converted signals. Unlike FIGS. 4 and 5, FIG. 7 shows signal values obtained in connection with a variation on a side with lightness lower than that at the maximum saturation of cyan.

Also in the present embodiment, for the two-side printing, the amount of dark ink used is increased while refraining from using the light ink. Specifically, only the dark magenta ink is used without using the light magenta ink (used amount 0). In the illustrated example, one-third of the amount of light ink arranged for the one-side printing is replaced with the dark ink. Of course, this replacement ratio depends on the characteristics of the light and dark inks used.

Although the light ink is not used within the range from cyan to black as described above, a small amount of light ink may be used on the lower lightness side of other hues. This depends on whether the priority is given to the granularity or to the landed ink amount. For example, it is contemplated that a small amount of light ink may be used within the range from yellow, a relatively bright color, to black because the granularity of the dark ink is marked within this range.

As described above, according to the embodiments of the present invention, printing data used to print the same color varies between one-side printing and two-side printing, and for the two-side printing and for the same ink color, the amount of ink of a lower concentration is reduced, while increasing the amount of ink of a higher concentration, compared to the one-side printing. It is thus possible to reduce the amount of ink ejected (landed or placed) per unit area of a printing medium for the two-side printing compared to one-side printing, while maintaining the gradation and a reduced granularity. This, in turn, makes it possible to reduce the amount of ink permeating through to the back side of a printing medium.

As a result, with the ink jet apparatus, the two-side printing with suppressed show through effect can be achieved while maintaining a specific print grade.

The present invention has been described in detail with respect to preferred embodiments and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. A printing method using a first printing material and a second material that is of the same color as that of the first printing material and has a higher development density than that of the first printing material, to print an image on a printing medium, said method comprising:
   a selecting step for selecting a printing mode to be used for printing from a one-side printing mode in which printing is performed on only one side of the printing medium and a two-side printing mode in which printing is performed on both sides of the printing medium; and
   a determining step for determining a printing condition according to the printing mode selected in said selecting step,
   wherein said determining step (A) determines the printing condition so that printing is performed with use of the first and the second printing materials, when the one-side printing mode is selected in said selecting step, and (B) determines the printing condition so that printing is performed with use of the second printing material but without use of the first printing material, when the two-side printing mode is selected in said selecting step.

2. A printing method using a first printing material having a relatively lower development density and a second printing material having a relatively higher development density for the same color, to print an image on a printing medium, said method comprising:
   a setting step for setting one printing mode from a one-side printing mode in which printing is performed on only one side of the printing medium and a two-side printing mode in which printing is performed on both sides of the printing medium; and
   a generating step for generating printing data according to the printing mode set in said setting step,
   wherein said generating step generates the printing data so that the first printing material is used at a smaller amount and the second printing material is used at a greater amount when the two-side printing mode is set, in comparison with when the one-side printing mode is set.

3. A printing method as claimed in claim 2, wherein said generating step generates the printing data so that a maximum value is set as the amount of the first printing material, which is set in a condition that lightness changes from a specific lightness to a predetermined darker lightness in a predetermined hue, and is set such that the amount of the first printing material is increased up to the predetermined darker lightness and is decreased from the predetermined darker lightness, and the maximum value of the two-side printing mode is set as a smaller value and at a brighter lightness in the change of the lightness than that for the one-side printing mode, and generates the printing data so that the amount of the second printing material is increased as the amount of the first printing material is decreased from the predetermined darker lightness.

4. A printing method as claimed in claim 3, wherein said generating step generates the printing data so that the amount of the second printing material is set as an amount greater than 0 at the lightness at which the amount of the first printing material has its maximum value.

5. A printing apparatus for using a first printing material and a second material that is of the same color as that of the first printing material and has a higher development density than that of the first printing material, to print an image on a printing medium, said apparatus comprising:
   selecting means for selecting a printing mode to be used for printing from a one-side printing mode in which printing is performed on only one side of the printing medium and a two-side printing mode in which printing is performed on both sides of the printing medium; and
   determining means for determining a printing condition according to the printing mode selected by said selecting means,
   wherein said determining means (A) determines the printing condition so that printing is performed with use of the first and the second printing materials, when the one-side printing mode is selected in said selecting step, and (B) determines the printing condition so that printing is performed with use of the second printing material but without use of the first printing material, when the two-side printing mode is selected by said selecting means.

6. A printing apparatus for using a first printing material having a relatively lower development density and a second printing material having a relatively higher development density for the same color, to print an image on a printing medium, said apparatus comprising:
   setting means for setting one printing mode from a one-side printing mode in which printing is performed on only one side of the printing medium and a two-side printing mode in which printing is performed on both sides of the printing medium; and
   generating means for generating printing data according to the printing mode set by said setting means,
   wherein said generating means generates the printing data so that the first printing material is used at a smaller amount and the second printing material is used at a greater amount when the two-side printing mode is set, in comparison with when the one-side printing mode is set.

7. A printing apparatus as claimed in claim 6, wherein said generating means generates the printing data so that a maximum value is set as the amount of the first printing material, which is set in a condition that lightness changes from a specific lightness to a predetermined darker lightness in a predetermined hue, and is set such that the amount of the first printing material is increased up to the predetermined darker lightness and is decreased from the predetermined darker lightness, and the maximum value of the two-side printing mode is set as a smaller value and at a brighter lightness in the change of the lightness than that for the one-side printing mode, and generates the printing data so that the amount of the second printing material is increased as the amount of the first printing material is decreased from the predetermined darker lightness.

8. A printing apparatus as claimed in claim 7, wherein said generating means generates the printing data so that the amount of the second printing material is set as an amount greater than 0 at the lightness at which the amount of the first printing material has its maximum value.

\* \* \* \* \*